(12) United States Patent
Matsushita

(10) Patent No.: US 6,935,635 B2
(45) Date of Patent: Aug. 30, 2005

(54) METAL GASKET

(75) Inventor: Yoshitaka Matsushita, Novi, MI (US)

(73) Assignee: McCord Leakless Sealing Co., Athens, AL (US)

( * ) Notice: Subject to any disclaimer, the term of this patent is extended or adjusted under 35 U.S.C. 154(b) by 0 days.

(21) Appl. No.: 10/733,914

(22) Filed: Dec. 11, 2003

(65) Prior Publication Data
US 2004/0262850 A1 Dec. 30, 2004

Related U.S. Application Data

(60) Provisional application No. 60/432,876, filed on Dec. 12, 2002.

(51) Int. Cl.$^7$ ................................................. F02F 11/00
(52) U.S. Cl. ........................ 277/592; 277/591; 277/593; 277/595
(58) Field of Search .................................. 277/591–598

(56) References Cited

U.S. PATENT DOCUMENTS 1,771,596 A    7/1930   Victor
5,348,311 A    9/1994   Miyaoh
6,027,124 A    2/2000   Ishida
6,062,573 A    5/2000   Budovec
2002/0135135 A1   9/2002   Fujino et al.

*Primary Examiner*—Enoch Peavey
(74) *Attorney, Agent, or Firm*—Howard & Howard

(57) ABSTRACT

A multi-layer metal gasket includes at least on active layer and at least one shim layer having aligned combustion holes. The shim layer has annular portions surrounding the combustion holes and tab portions projecting radially outwardly from the annular portions surrounding the combustion holes. The annular portions underlie associated sealing beads of the active layer. The tab portions each have a radially extending neck region and a set of lateral bend tabs supported at the end of the neck region and projecting laterally outwardly thereof. The bend tabs project through an associated set of laterally spaced mounting windows formed in the active layer and are bent back toward one another to secure the shim layer to the active layer.

14 Claims, 3 Drawing Sheets

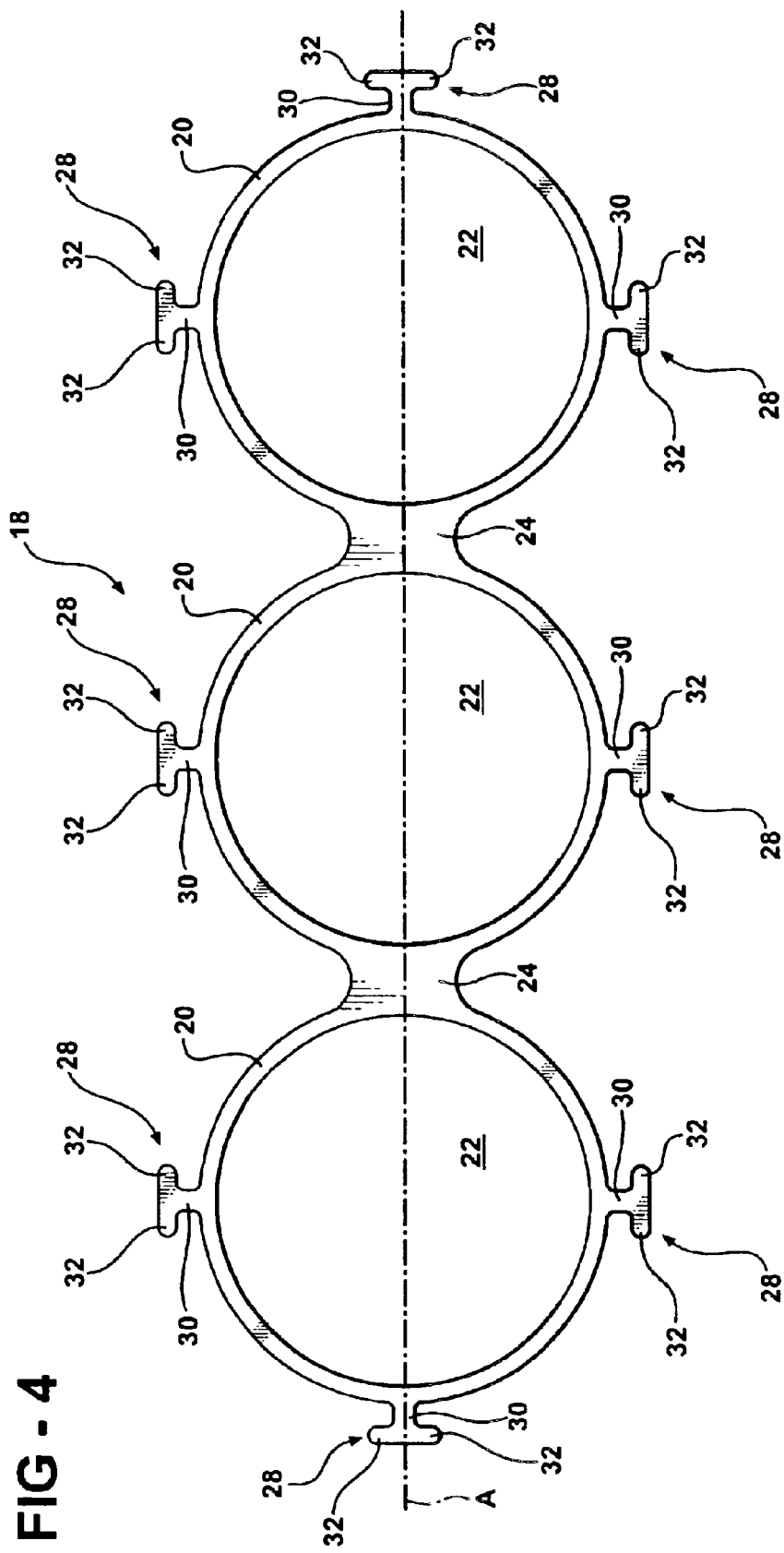

METAL GASKET

This application claims the benefit of U.S. Provisional Application No. 60/432,876, filed Dec. 12, 2002.

BACKGROUND OF THE INVENTION

1. Technical Field

This invention relates generally to multi-layered steel gaskets, and more particularly to the attachment of an intermediate stopper layer between adjacent active layers.

2. Related Art

U.S. Published application 2002/0135135 A1 discloses a metal gasket having an intermediate stopper layer disposed between two outer active layers and having a plurality of radial tab portions extending along a respective radial axis, and then bent out of the plane to extend through an associated window in one of the active layers and then further bent back upon itself in overlying relation to the active layer along the axis of the bend tab. One disadvantage with such a structure is that when the gasket is clamped between a head and a block, clamping forces are applied to the bent tab region which are transmitted through the tab back to the stopper layer and can have the effect of introducing undesirable stresses in the vicinity of the sealing beads of the active layers so as to impair the sealing ability of the gasket, particularly in connection with closed deck engine block/cylinder head applications.

It is an object of the present invention to overcome or greatly minimize the deficiencies of the prior gasket assembly.

SUMMARY OF THE INVENTION AND ADVANTAGES

A multi-layer metal gasket constructed according to the present invention includes at least one active layer and at least one shim layer. The active layer and shim layer have aligned combustion holes and the shim layer has annular portions surrounding the combustion holes and tab portions projecting radially outwardly from the annular portions. The annular portions underlie associated combustion beads of the active layer. The tab portions include a radially extending neck region supporting a set of lateral bend tabs at a radially outer end of the neck region that project laterally outwardly of the neck region. The bend tabs project through an associated set of laterally spaced mounting windows formed in the at least one active layer, and the tabs are bent back toward one another to secure the shim layer to the at least one active layer.

The invention has the advantage of locating the bent tabs out of line with the neck regions of the tab portions. As such, when the gasket is clamped between two members to be sealed, such as a cylinder head and gasket, there is no direct line of stress back through the neck region that would result from clamping force applied to the laterally oriented bend tabs which might otherwise introduce a concentrated stress in the vicinity of the sealing bead that could impair the sealing ability of the gasket.

According to a preferred embodiment of the invention, the active layer further includes a relief window situated between the two clamping windows and overlying relation to the neck region. This relief window further acts to minimize any transferred stress due to clamping against the bend tabs back through the shim layer or active layer to the sealing bead, thereby promoting greater integrity of the seal.

BRIEF DESCRIPTION OF THE DRAWINGS

These and other features and advantages of the present invention will become more readily appreciated when considered in connection with the following detailed description and appended drawings, wherein:

FIG. 4 is a plan view of the shim layer; and

DETAILED DESCRIPTION OF THE PREFERRED EMBODIMENT

Figure 1:
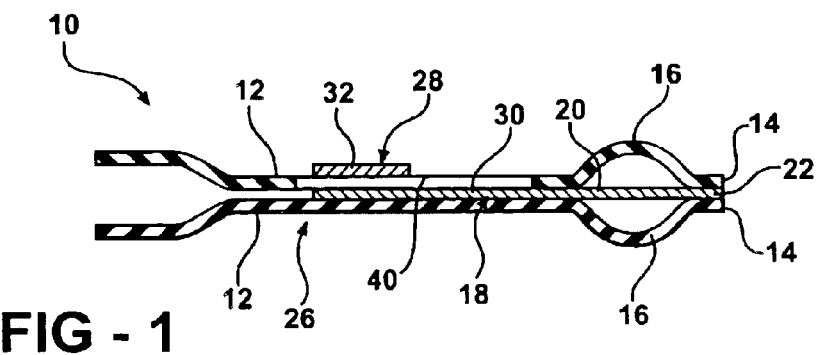
FIG. 1 is a cross-section view taken along lines 1-1 of FIG. 3.

FIG. 1 is a cross-sectional view through a multi-layer metal gasket of the type used to seal one or more combustion chamber openings of an engine. The multi-layer gasket 10 is designed in the usual manner to be clamped between a cylinder head and engine block of an engine to seal the various passages communicating between the head and block, including one or more combustion chamber openings.

Figure 2:
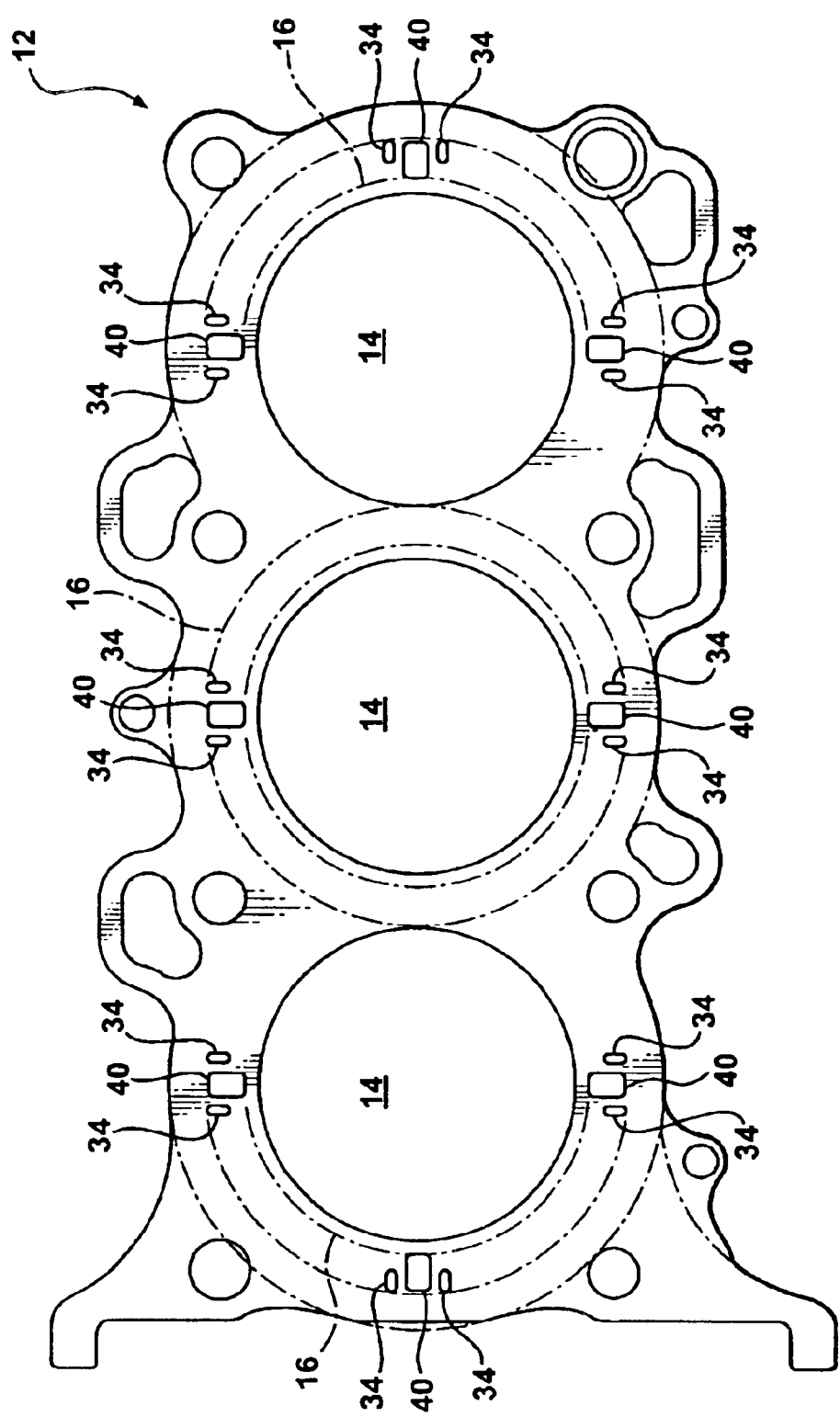
FIG. 2 is a plan view of a gasket constructed according to a presently preferred embodiment of the invention.

The gasket 10 includes at least one and preferably at least two resilient active layers 12 formed with at least one combustion chamber opening 14 sized and positioned to align with the combustion chamber of the engine. FIG. 2 is a plan view of the at least one active layer 12. In the disclosed embodiment, the active layer 12, and thus the gasket 10, is formed with three such combustion chamber openings 14.

Figure 3:
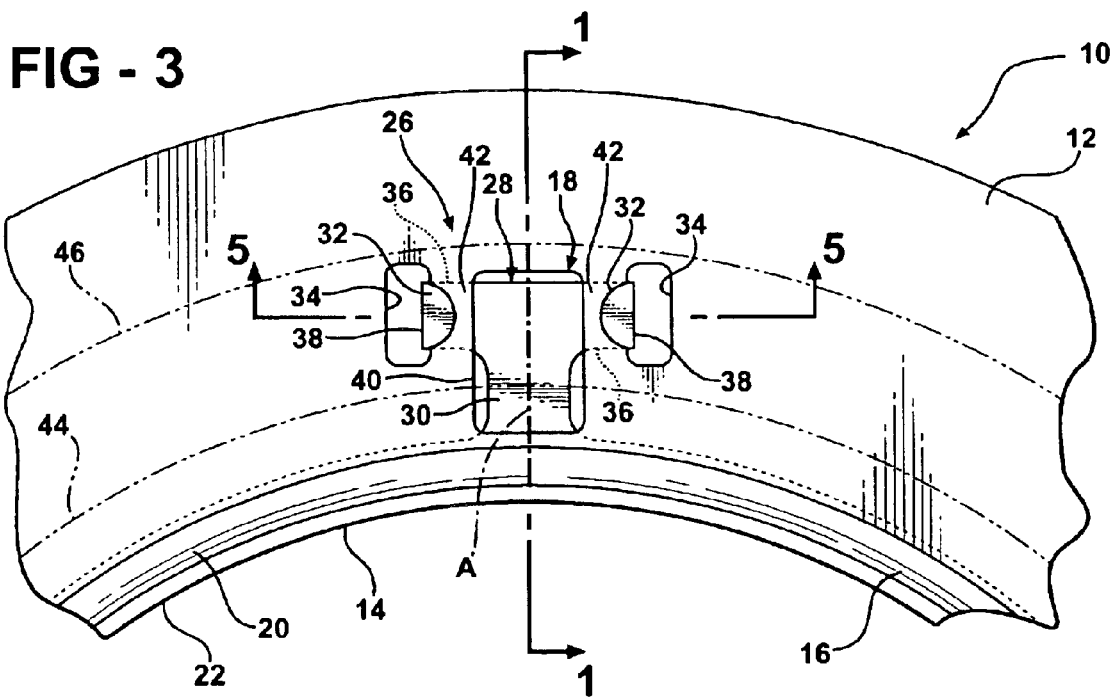
FIG. 3 is an enlarged fragmentary plan view of a portion of the gasket of FIGS. 1 and 2.

As best shown in FIGS. 1 and 2, the outer active layers 12 of the gasket 10 are formed with a seal embossment 16 surrounding each combustion chamber openings 14. The seal embossments 16 project above (or below) a plane of the active layers 12 and, when compressed between the head and block, deform elastically to form a fluid-type seal about the combustion chamber openings 14 and thus the combustion chambers of the engine in known manner. The gasket 10 further includes a stopper or shim layer 18 that is disposed adjacent one side of at least one active layer or, in the case of the disclosed embodiment in which there are two active layers, disposed between the layers, to control the compression of the embossments 16. Referring additionally to FIGS. 3 and 4, the shim layer 18 includes annular portions 20 having central openings 22 aligned with the edges of the combustion chamber openings 14 of the active layers and underlying the annular seal embossments 16 about the circumference of the openings 14. The annular portions 20 terminate in the vicinity of the radially outer extent of the seal embossments 16. As such, the shim layer 18 extends from the combustion openings 14 of the active layers 12, but is non-continuous with respect to the entirety of the active layers 12. The annular portions 20 associated with each combustion chamber opening 14 are preferably joined to another across a bridging portion 24 between adjacent annular portions, as shown best in FIG. 4. The bridging portions 24 are disposed between adjacent ones of the combustion openings 14. The shim layer 18 is preferably formed as one piece as shown in FIG. 4.

The shim layer 18 is connected to one of the adjacent active layers 12 by connecting structure 26 of the shim 18 and active layers 12. The connecting structure 26 includes tab portions 28 of the shim layer 18 projecting radially outwardly of the annular portions 20 at select locations, for example those shown in FIG. 4. The tab portions 28 have a narrow neck region 30 that extends along a radial axis A of each neck portion, and terminates at its radially outer end with at least one and preferably a pair of transverse plastically deformable bend tabs 32 which are transverse to and spaced from the axis A of the neck portion 30. As shown best in FIG. 4, the tab portions 28 have preferably a "T" shape, with the vertical base of the T representing the neck region 30, and the cross portion representing the bend tabs 32.

Figure 5:
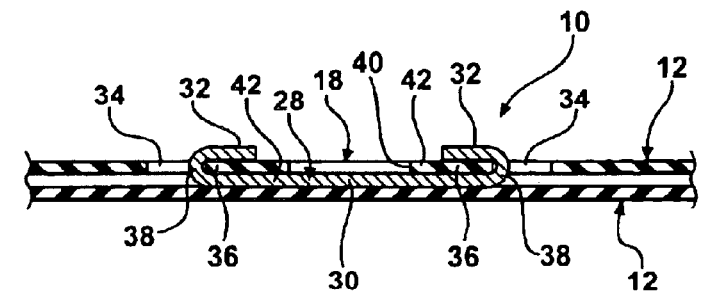
FIG. 5 is a cross-sectional view taken along lines 5-3 of FIG. 3.

The connecting structure 26 further includes associated openings or mounting windows 34 formed in the active layer 12 to which the shim layer 18 is attached. The windows 34 are sized and positioned to receive the bend tabs 32 which, as best shown in FIGS. 3 and 6, extend through the windows 34 and are bent over toward one another, to effectively wrap the tabs 32 about an overlapped region 36 of the active layer 12 to which it is attached. The overlapped regions 36 onto which the tabs 32 are bent are spaced laterally from one another and from the neck region 30 of the tab portions 28. The overlapped regions 36 are further spaced from the annular portions 20 of the shim layer 18 as well as the seal embossments 16 of the active layer 12 to which the shim layer 18 is attached. As best shown in FIGS. 3 and 5, the bend tabs 32 each have a fold line 38 at the edge of each corresponding window 34 which is spaced laterally from the neck region 30, such that the bend tabs 38 are folded upon themselves, rather than upon the neck region 30. The windows 34 preferably are wide enough to enable the bend tabs 32 to be bent initially from a flat condition in the plane of the tab portions 28 upwardly through the windows 34 and back onto the overlapped regions 36 of the active layer 12 to which the shim layer 18 is attached.

The active layer 12 to which the shim layer 18 is attached further preferably includes a central cutout or relief window 40 extending along the axis A radially outwardly of the seal embossments 16 and beyond the radially outer end of the tab portions 28, as best illustrated in FIG. 3. This relief window 40 is preferably slightly wider than the neck region 30 of the tab portion 28, but is spaced inwardly from the ends of the bent over tabs 32. The windows 34,40 define a relatively thin clamping portion 42 of the active layer 12 to which the shim layer 18 is attached and onto which the bend tabs 32 are folded. This clamping portion 42 is spaced from the neck region 30 of the tab portion 28 and defines, in part, the overlapped regions 36 of the active layer 12. The tab portions 28 and windows 34 thus serve to connect the shim layer 18 to the active layer 12.

The gasket 10 according to the invention is usable with both open and closed deck engine block applications. Broken chain lines 44 and 46 of FIG. 3 represent the location of the connecting structure 26 relative to an open deck application, wherein 44 and 46 represent the side walls of an open chamber of the block extending to the top deck such that the region between the boundaries 44, 46 is open and unsupporting of the connecting structure 26. When the gasket 10 is clamped between the head and block of such an open deck engine applications, the connecting structure 26 is permitted to deflect down into the open area and thus not impede or introduce intolerable resistance or stresses back on the seal embossment 16 that would impair the desired sealing characteristics of the embossments 16.

When the gasket 10 of the invention is clamped between a closed deck head and block (in which case the broken chain lines 44, 46 would be absent in the head and block above and below the connecting structure solid), the seal embossments 16 are compressed to form a seal about the combustion chambers, and the bent over tabs 32 are also compressed. The narrow clamping portions 42 and intermediate relief window 40 concentrate the clamping forces in the narrow clamping portion 42, at locations spaced from one another and the axis A of the neck region 30. In this manner, any resistance caused by the compression of the bent tabs 32 is highly localized and is not spread across the full width of the tab portions 28. This localization further limits the impact of that the bent tabs have on the sealing forces imparted to the seal embossments 16. To the extent that the compression of the bent tabs 32 act to disrupt uniform clamping of the seal embossment 16 in the region of the tab portions 28, any such reduction in clamping pressure is highly localized in radial line with the clamping portions 42, which are very narrow and further which are spaced from one another so as to have minimal impact on the sealability of the embossments 16.

Obviously, many modifications and variations of the present invention are possible in light of the above teachings. It is, therefore, to be understood that within the scope of the appended claims, the invention may be practiced otherwise than as specifically described. The invention is defined by the claims.

What is claimed is:

1. A multi-layer metal gasket comprising:
at least one active layer, at least one shim layer, the active layer and shim layer having aligned combustion holes, the shim layer having annular portions surrounding the combustion holes and tab portions projecting radially outwardly from the annular portions, the annular portions underlying associated sealing beads of at least one of the active layers, the tab portions including a radially extending neck region supporting a set of lateral bend tabs at a radially outer end thereof projecting laterally outwardly of the neck region, said bend tabs projecting through an associated set of laterally spaced mounting windows formed in the at least one active layer and being bent back toward one another to secure the shim layer to the at least one active layer.

2. The gasket of claim 1 wherein said bend tabs extend transverse to said neck region.

3. The gasket of claim 1 wherein said at least one active layer includes a relief window lying along an axis of said neck region between said mounting windows.

4. A multi-layer metal gasket comprising:
at least one active layer, at least one shim layer, the active layer and shim layer having aligned combustion holes, the shim layer having annular portions surrounding the combustion holes and tab portions projecting radially outwardly from the annular portions, the annular portions underlying associated sealing beads of at least one of the active layers, the tab portions including a radially extending neck region supporting a set of lateral bend tabs at a radially outer end thereof projecting laterally outwardly of the neck region, said bend tabs projecting through an associated set of laterally spaced mounting windows formed in the at least one active layer and being bent back toward one another to secure the shim layer to the at least one active layer, wherein said at least one active layer includes a relief window lying along an axis of said neck region between said mounting windows, and wherein said at least one active layer includes an overlapped region separating said relief window from each of said mounting windows.

5. The gasket of claim 4 wherein said bend tabs each included a clamping portion 42 folded over against said overlapped regions.

6. The gasket of claim 5 wherein said relief window is relatively greater in width than that of said neck portion.

7. The gasket of claim 5 wherein said relief window extends axially beyond said tab portions.

8. The gasket of claim 1 wherein there are at least two active layers.

9. The gasket of claim 8 wherein said shim is joined to only one of said active layers by said bend tabs.

10. The gasket of claim 1 wherein said sealing beads surround said combustion holes.

11. The gasket of claim 1 wherein said shim layer only partially overlaps said active layer.

12. A multi-layer metal gasket comprising:

at least one active layer, at least one shim layer, the active layer and shim layer having aligned combustion holes, the shim layer having annular portions surrounding the combustion holes and tab portions projecting radially outwardly from the annular portions, the annular portions underlying associated sealing beads of at least one of the active layers, the tab portions including a radially extending neck region supporting a set of lateral bend tabs at a radially outer end thereof protecting laterally outwardly of the neck region, said bend tabs projecting through an associated set of laterally spaced mounting windows formed in the at least one active layer and being bent back toward one another to secure the shim layer to the at least one active layer, wherein said neck region and said bend tabs together have a generally T-shaped configuration.

13. The gasket of claim 1 wherein said bend tabs are spaced from said annular portions.

14. The gasket of claim 1 wherein said bend tabs each include a fold line spaced laterally outwardly of said neck region.

* * * * *

UNITED STATES PATENT AND TRADEMARK OFFICE
CERTIFICATE OF CORRECTION

PATENT NO. : 6,935,635 B2
DATED : August 30, 2005
INVENTOR(S) : Matsushita

It is certified that error appears in the above-identified patent and that said Letters Patent is hereby corrected as shown below:

<u>Column 6,</u>
Line 2, replace "protecting" with -- projecting --.

Signed and Sealed this

Ninth Day of May, 2006

JON W. DUDAS
*Director of the United States Patent and Trademark Office*